(12) United States Patent
Yasui

(10) Patent No.: US 11,964,656 B2
(45) Date of Patent: Apr. 23, 2024

(54) TRAVEL CONTROL DEVICE

(71) Applicant: ADVICS CO., LTD., Kariya (JP)

(72) Inventor: Takuya Yasui, Nagoya (JP)

(73) Assignee: ADVICS CO., LTD., Kariya (JP)

( * ) Notice: Subject to any disclaimer, the term of this patent is extended or adjusted under 35 U.S.C. 154(b) by 925 days.

(21) Appl. No.: 16/969,431

(22) PCT Filed: Mar. 8, 2019

(86) PCT No.: PCT/JP2019/009470
§ 371 (c)(1),
(2) Date: Aug. 12, 2020

(87) PCT Pub. No.: WO2019/188142
PCT Pub. Date: Oct. 3, 2019

(65) Prior Publication Data
US 2021/0001846 A1    Jan. 7, 2021

(30) Foreign Application Priority Data
Mar. 28, 2018   (JP) .................................. 2018-062751

(51) Int. Cl.
*B60W 30/14*      (2006.01)
*B60W 30/16*      (2020.01)
(Continued)

(52) U.S. Cl.
CPC ........ *B60W 30/146* (2013.01); *B60W 30/162* (2013.01); *B60W 50/087* (2013.01); *B60W 50/12* (2013.01); *B60W 2520/105* (2013.01)

(58) Field of Classification Search
CPC ............. B60W 30/146; B60W 30/162; B60W 50/087; B60W 50/12; B60W 2520/105;
(Continued)

(56) References Cited

U.S. PATENT DOCUMENTS

2015/0321671 A1* 11/2015 Simmons ............ B60W 30/143
                                                                701/93
2016/0304080 A1* 10/2016 Sugiyama ............. B60W 30/16
(Continued)

FOREIGN PATENT DOCUMENTS

JP    2016078744 A    5/2016
JP    2018020590 A    2/2018

OTHER PUBLICATIONS

International Search Report (PCT/ISA/210) dated May 28, 2019, by the Japanese Patent Office as the International Searching Authority for International Application No. PCT/JP2019/009470.
(Continued)

*Primary Examiner* — Masud Ahmed
(74) *Attorney, Agent, or Firm* — BUCHANAN INGERSOLL & ROONEY PC

(57) ABSTRACT

A travel control device assists automatic traveling of a vehicle by controlling a target vehicle speed, which is a target value of an actual vehicle speed, when making the vehicle travel to a target point. The travel control device includes a setting unit for executing a setting process for setting the course of the target vehicle speed until the vehicle reaches the target point, based on the actual vehicle speed and the target point. If a request to change the vehicle speed occurs during execution of the automatic traveling and the actual vehicle speed is changed based on the request, the setting unit executes a resetting process for resetting the course of the target vehicle speed, based on the actual vehicle speed when the request is canceled and a remaining distance from a position of the vehicle when the request is canceled to the target point.

18 Claims, 5 Drawing Sheets

(51) Int. Cl.
  *B60W 50/08*     (2020.01)
  *B60W 50/12*     (2012.01)
(58) Field of Classification Search
  CPC . B60W 2050/0008; B60W 2050/0012; B60W 60/001; B60W 2050/0083; B60W 2520/10; B60W 2540/12; B60W 30/143; B60W 2556/50; B60W 2720/103; B60K 2310/244; B60K 31/00; G08G 1/16
  See application file for complete search history.

(56)  References Cited

U.S. PATENT DOCUMENTS

| | | | |
|---|---|---|---|
| 2017/0297453 A1 | 10/2017 | Hashimoto | |
| 2018/0134296 A1* | 5/2018 | Oh | B60W 10/08 |
| 2018/0162397 A1* | 6/2018 | Eo | B60W 20/15 |
| 2019/0293758 A1* | 9/2019 | Masui | G08G 1/16 |
| 2019/0337514 A1* | 11/2019 | Natsumi | B60W 30/12 |
| 2020/0180632 A1* | 6/2020 | Morita | B60W 30/14 |
| 2020/0300969 A1* | 9/2020 | Masui | G01S 7/411 |
| 2021/0101574 A1* | 4/2021 | Bakewell | B60W 10/18 |

OTHER PUBLICATIONS

Written Opinion (PCT/ISA/237) dated May 28, 2019, by the Japanese Patnet Office as the International Searching Authority for International Application No. PCT/JP2019/009470.

* cited by examiner

TRAVEL CONTROL DEVICE

TECHNICAL FIELD

The present invention relates to a travel control device for a vehicle.

BACKGROUND ART

From PTL 1, a travel control device for assisting automatic traveling of a vehicle is disclosed. In such a traveling assist device, an operation amount is calculated such that a deviation between a target point and an actual position of the vehicle which changes over time can be reduced. Then, a vehicle speed of the vehicle can be controlled by controlling a driving device or a braking device of the vehicle based on the operation amount.

Also, if it is determined that the actual position is not following the target point, the travel control device suppresses a deviation between the actual position and the target point from being increased by maintaining the target point. Accordingly, when the vehicle speed of the vehicle is temporarily lowered, such as when wheels of the vehicle climb up a step, it is possible to suppress the operation amount from becoming excessive, thereby preventing a sudden acceleration of the vehicle.

CITATION LIST

Patent Literature

PTL 1: Japanese Patent Application Publication No. 2016-78744

SUMMARY OF INVENTION

Technical Problem

When the driving device or the braking device is being controlled based on the operation amount corresponding to the deviation between the target point and the actual position, a request to change the speed of the vehicle by, for example, a braking operation by a driver of the vehicle may be inputted to the travel control device. In this case, the request is granted priority and the speed of the vehicle is changed. In the travel control device disclosed from PTL 1, a case where the request occurs under a situation in which the driving device or the braking device is being controlled based on the operation amount is not considered.

Solution to Problem

In order to solve the above object, the invention is directed to a travel control device for assisting automatic traveling of a vehicle by controlling a target vehicle speed when making the vehicle travel to a target point, wherein the target vehicle speed is a target value of an actual vehicle speed which is a speed of the vehicle, the travel control device including: a setting unit for executing a setting process for setting the course of the target vehicle speed until the vehicle reaches the target point, based on the actual vehicle speed and the target point; and an operation amount calculation unit for calculating an operation amount used to control at least one of a driving device and a braking device of the vehicle so that the actual vehicle speed follows the target vehicle speed, wherein the setting unit is configured: if a request to change the vehicle speed of the vehicle occurs during execution of the automatic traveling and the actual vehicle speed is changed based on the request, to execute a resetting process for resetting the course of the target vehicle speed, based on the actual vehicle speed when the request is canceled and a remaining distance from a position of the vehicle when the request is canceled to the target point.

The course of the actual vehicle speed is different between a case, in which a request to change the vehicle speed of the vehicle occurs while the automatic traveling for moving the vehicle to the target point is being executed and thus the actual vehicle speed is changed based on the request, and a case, in which the request does not occur. Therefore, if, even after the request is canceled, an operation amount is calculated using the target vehicle speed based on the course of the target vehicle speed set before the request occurs and then the driving device or the braking device is driven based on the operation amount, there is a risk that automatic traveling for moving the vehicle to the target point is disrupted.

In this regard, according to the above configuration, if the request to change the vehicle speed of the vehicle is canceled, the resetting process is executed to reset the course of the target vehicle speed, based on the actual vehicle speed when the request is canceled and a remaining distance from a position of the vehicle when the request is canceled to the target point. Then, the operation amount is calculated using the target vehicle speed based on the course of the reset target vehicle speed. Further, by driving the driving device or the braking device based on the operation amount, it is possible to move the vehicle to the target point even when the request occurs during automatic traveling.

DESCRIPTION OF EMBODIMENTS

Hereinafter, a travel control device 10, which is one embodiment of a travel control device, will be described with reference to FIGS. 1 to 10.

Figure 1:
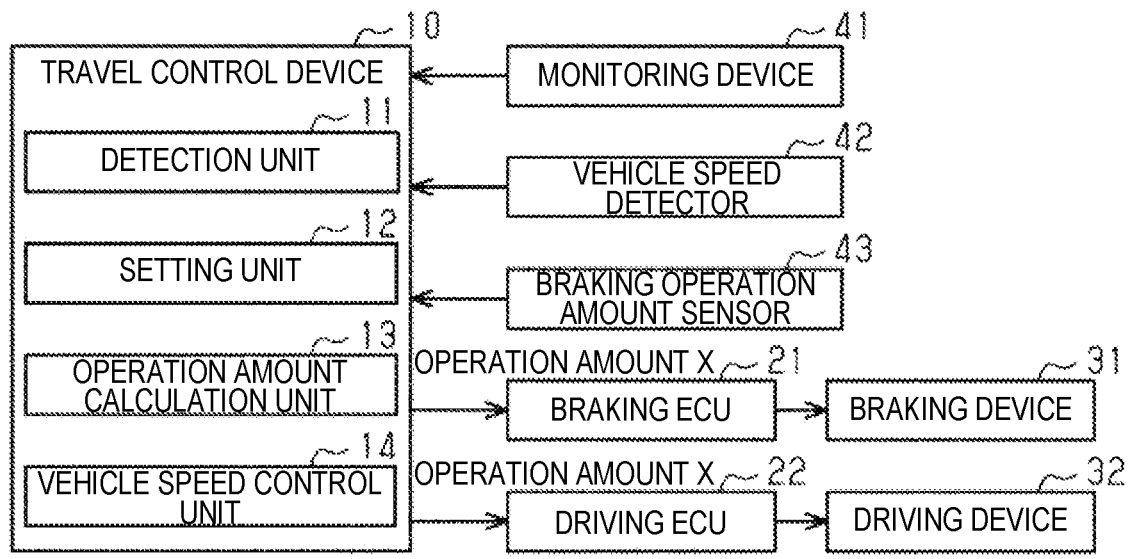
FIG. 1 is a view showing an embodiment of a travel control device and a schematic configuration of a vehicle to which the travel control device is applied.

In FIG. 1, a travel control device 10 to be mounted on a vehicle is shown. A detection signal from a monitoring device 41 equipped in the vehicle is inputted to the travel control device 10. The monitoring device 41 is constructed by, for example, an imaging device or a millimeter wave radar device mounted on the vehicle. The monitoring device 41 is configured to acquire information around the vehicle and to calculate a relative distance between an obstacle around the vehicle and the vehicle. A detection signal from a vehicle speed detector 42 equipped in the vehicle is inputted to the travel control device 10. The vehicle speed detector 42 is configured to calculate a vehicle body speed of the vehicle based on a speed of each of wheels of the vehicle. A signal from a braking operation amount sensor 43 for detecting an operation amount of the brake pedal in the vehicle is inputted to the travel control device 10.

Also, a braking ECU 21 and a driving ECU 22 are mounted on the vehicle. The braking ECU 21 and the driving ECU 22 are configured to be capable of transmitting and receiving various information to and from the travel control device 10. The braking ECU 21 is configured to control driving of a braking device 31 of the vehicle. The driving ECU 22 is configured to control driving of a driving device 32 of the vehicle.

The travel control device 10 is configured to set a target point LE and also to execute automatic travel control for assisting automatic traveling of the vehicle, such as moving the vehicle to the target point LE and then stopping the vehicle. Then, the travel control device 10 includes a detection unit 11, a setting unit 12, an operation amount calculation unit 13, and a vehicle speed control unit 14 as function units required to execute the automatic travel control.

The detection unit 11 is configured to acquire the vehicle body speed inputted from the vehicle speed detector 42 as an actual vehicle speed Vs. The detection unit 11 is configured to detect whether or not a braking operation by a driver of the vehicle is present, based on a detection signal from the braking operation amount sensor 43. The detection unit 11 is configured to calculate parameters corresponding to an actual position of the vehicle based on a signal inputted from the monitoring device 41. Further, the detection unit 11 is configured to calculate a distance from the actual position to the target point LE for the automatic travel control as a remaining distance Lr.

Meanwhile, the detection unit 11 can detect a rotation amount of the wheels based on a signal inputted from the vehicle speed detector 42 and calculate a travel distance of the vehicle during a predetermined period of time based on the rotation amount.

The setting unit 12 is configured to execute a setting process for setting a speed profile to be used for the automatic travel control. The speed profile is the course of a target vehicle speed over time. Also, when a condition for resetting the speed profile is established, the setting unit 12 executes a resetting process for resetting the speed profile while the vehicle is moving toward the target point LE.

The operation amount calculation unit 13 is configured to calculate an operation amount X used for controlling at least one of the braking device 31 and the driving device 32 of the vehicle so that the actual vehicle speed Vs follows the target vehicle speed. For example, when the vehicle has to be accelerated, the operation amount calculation unit 13 calculates an operation amount X for the driving device 32. Also, for example, when the vehicle has to be decelerated, the operation amount calculation unit 13 calculates an operation amount X for the braking device 31. In addition, in order to make the actual vehicle speed Vs close to the target vehicle speed, the operation amount calculation unit 13 may calculates both an operation amount X for the braking device 31 and an operation amount X for the driving device 32.

When calculating the operation amount X, the operation amount calculation unit 13 executes F/F control based on the target vehicle speed and an amount of change in the target vehicle speed of the vehicle per unit time, and F/B control using, as an input, a deviation between the target vehicle speed and the actual vehicle speed Vs. The term "F/F control" is feed forward control, and the term "F/B control" is feedback control. Also, the operation amount calculation unit 13 is configured to calculate the sum of a control amount calculated by the F/F control and a control amount calculated by the F/B control as the operation amount X. However, as described in detail below, when executing of the F/B control is prohibited, the operation amount calculation unit 13 sets the control amount calculated by the F/F control as the operation amount X.

The vehicle speed control unit 14 is configured to output the operation amount X calculated by the operation amount calculation unit 13 to at least one of the braking ECU 21 and the driving ECU 22.

Figure 2:
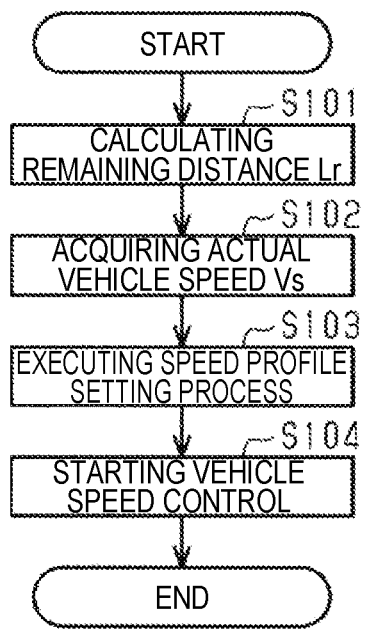
FIG. 2 is a flow chart showing a processing routine of automatic travel control to be executed in the travel control device.

A processing routine of the automatic travel control to be executed by the travel control device 10 will be described with reference to FIG. 2. Executing of the present processing routine is started based on a starting operation of the automatic travel control by the driver of the vehicle.

If the present processing routine is executed, first, in a step S101, a remaining distance Lr from the actual position of the vehicle to the target point LE for the automatic travel control is calculated by the detection unit 11. If the remaining distance Lr is calculated, the process proceeds to a step S102. In the step S102, the actual vehicle speed Vs is acquired by the detection unit 11. In the next step S103, a speed profile setting process is executed by the setting unit 12.

The speed profile setting process to be executed by the setting unit 12 will be described.

The automatic travel control to be executed by the travel control device 10 includes a plurality of travel modes for the vehicle. The plurality of travel modes includes an acceleration mode, a constant speed mode, and a deceleration mode. In the acceleration mode, the vehicle is accelerated in a state where a limited vehicle speed is set as an upper limit. In the constant speed mode, the vehicle speed is maintained at the limited vehicle speed. In the deceleration mode, the vehicle speed is decelerated from the limited vehicle speed to "0 km/h". On the other hand, in the setting process executed in the step S103, a basic limited vehicle speed Vt is selected as the limited vehicle speed.

In the speed profile setting process, the course of the target vehicle speed in the acceleration mode is set by regarding, as a basic acceleration distance La, a distance by which the vehicle will travel while the vehicle is accelerating in a state where the basic limited vehicle speed Vt is set as the upper limit. Also, the course of the target vehicle speed in the constant speed mode is set by regarding, as a basic constant speed distance Lc, a distance by which the vehicle will travel while maintaining the vehicle speed at the basic limited vehicle speed Vt. Further, the course of the target vehicle speed in the deceleration mode is set by regarding, as a basic deceleration distance Ld, a distance by which the vehicle will travel while decreasing the vehicle speed from the basic limited vehicle speed Vt to "0 km/h".

The basic acceleration distance La, the basic constant speed distance Lc and the basic deceleration distance Ld are calculated such that the sum of the basic acceleration distance La, the basic constant speed distance Lc and the basic deceleration distance Ld becomes the remaining distance Lr. The basic acceleration distance La, the basic constant speed distance Lc and the basic deceleration distance Ld can be calculated using the following relational expression (Eq. 1, Eq. 2 and Eq. 3).

[Expression 1]

$$La = \frac{Vt^2 - Vs^2}{2G} \quad \text{(Eq. 1)}$$

$$Ld = \frac{Vt^2}{2G} \quad \text{(Eq. 2)}$$

$$Lc = Lr - (La + Ld) \quad \text{(Eq. 3)}$$

As shown in the relational expression (Eq. 1, Eq. 2 and Eq. 3), the basic acceleration distance La and the basic deceleration distance Ld are calculated based on the basic limited vehicle speed Vt, the actual vehicle speed Vs and a reference acceleration G. That is, the smaller the actual vehicle speed Vs, the longer the basic acceleration distance La becomes. Also, the basic constant speed distance Lc is calculated based on the remaining distance Lr, the basic acceleration distance La and the basic deceleration distance Ld.

As described above, if the speed profile is set by the setting unit 12 in the step S103, the process proceeds to a step S104.

In the step S104, vehicle speed control is started. That is, calculating of the operation amount X by the operation amount calculation unit 13 is started, and also outputting of the operation amount X by the vehicle speed control unit 14 to the braking ECU 21 or the driving ECU 22 is started. Thereafter, the present processing routine is ended.

If the operation amount X is inputted to the braking ECU 21 or the driving ECU 22, the braking ECU 21 drives the braking device 31 based on the inputted operation amount X, or the driving ECU 22 drives the driving device 32 based on the inputted operation amount X. Accordingly, the vehicle travels in such a manner that the actual vehicle speed Vs follows the target vehicle speed.

On the other hand, the vehicle speed control started in the step S104 is ended if the vehicle reaches the target point LE and the remaining distance Lr becomes "0" and thus the vehicle stops. Alternatively, the vehicle speed control may be ended by an interrupt operation by the driver of the vehicle.

Figure 3:
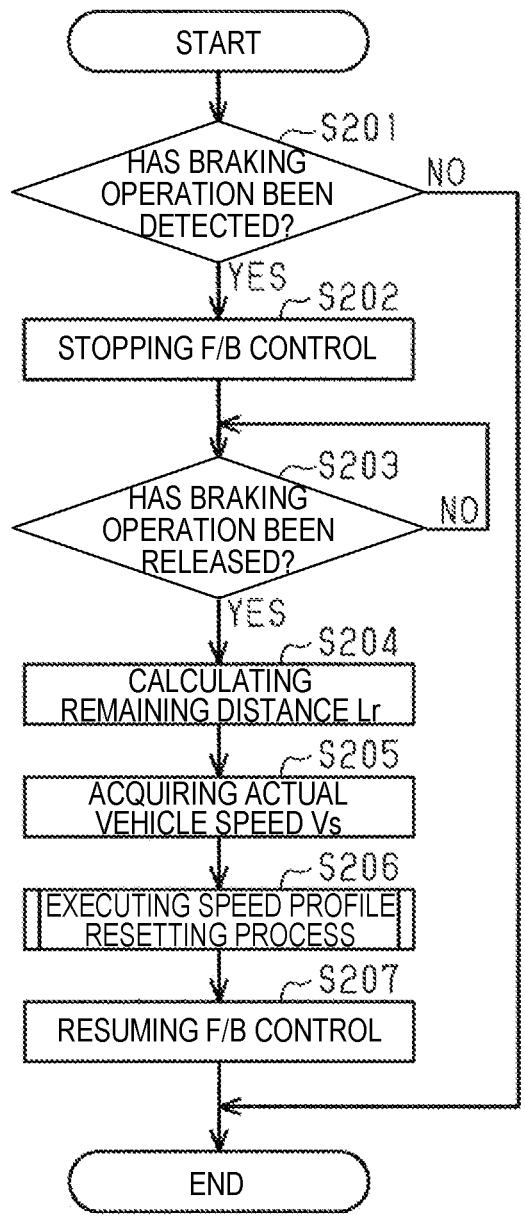
FIG. 3 is a flow chart showing a processing routine of an interrupt process to be executed in the travel control device.

A processing routine of an interrupt process to be executed during execution of the vehicle speed control will be described with reference to FIG. 3. This processing routine is repeatedly executed during execution of the vehicle speed control.

If the present processing routine is executed, first, in a step S201, the detection unit 11 determines whether or not a braking operation has been detected. If the braking operation has been detected, it can be determined that a request to change the vehicle speed has occurred. On the other hand, if the braking operation has not been detected, it can be determined that the request has not occurred. If the braking operation has not been detected (S201: NO), the present processing routine is ended for the moment.

On the other hand, if the braking operation has been detected (S201: YES), the process proceeds to a step S202. In the step S202, interrupting executing of the F/B control is commanded to the operation amount calculation unit 13. If executing of the F/B control is interrupted in this way, the operation amount calculation unit 13 derives a control amount calculated by the F/F control as an operation amount X. Then, if the F/B control is interrupted, the process proceeds to a step S203.

In the step S203, the detection unit 11 determines whether or not the request detected in the step S201 has been canceled, that is, whether or not the braking operation has been released. If the braking operation is continued (S203: NO), the processing of the step S203 is repeatedly executed.

On the other hand, if the braking operation has been released (S203: YES), the process proceeds to a step S204. In the step S204, the remaining distance Lr is calculated by the detection unit 11. That is, a distance from the actual position of the vehicle when the request has been canceled to the target point LE is calculated as the remaining distance Lr. Subsequently, the process proceeds to a step S205 and an actual vehicle speed Vs when the request has been canceled is acquired by the detection unit 11. Subsequently, the process proceeds to a step S206. In the step S206, the speed profile resetting process as described below is executed by the setting unit 12. In the next step S207, resuming executing of the F/B control is commanded to the operation amount calculation unit 13. If executing of the F/B control is resumed in this way, the operation amount calculation unit 13 calculates the sum of a control amount calculated by the F/F control and a control amount calculated by the F/B control as an operation amount X. After the F/B control has been resumed, the present processing routine is ended for the moment.

Figure 4:
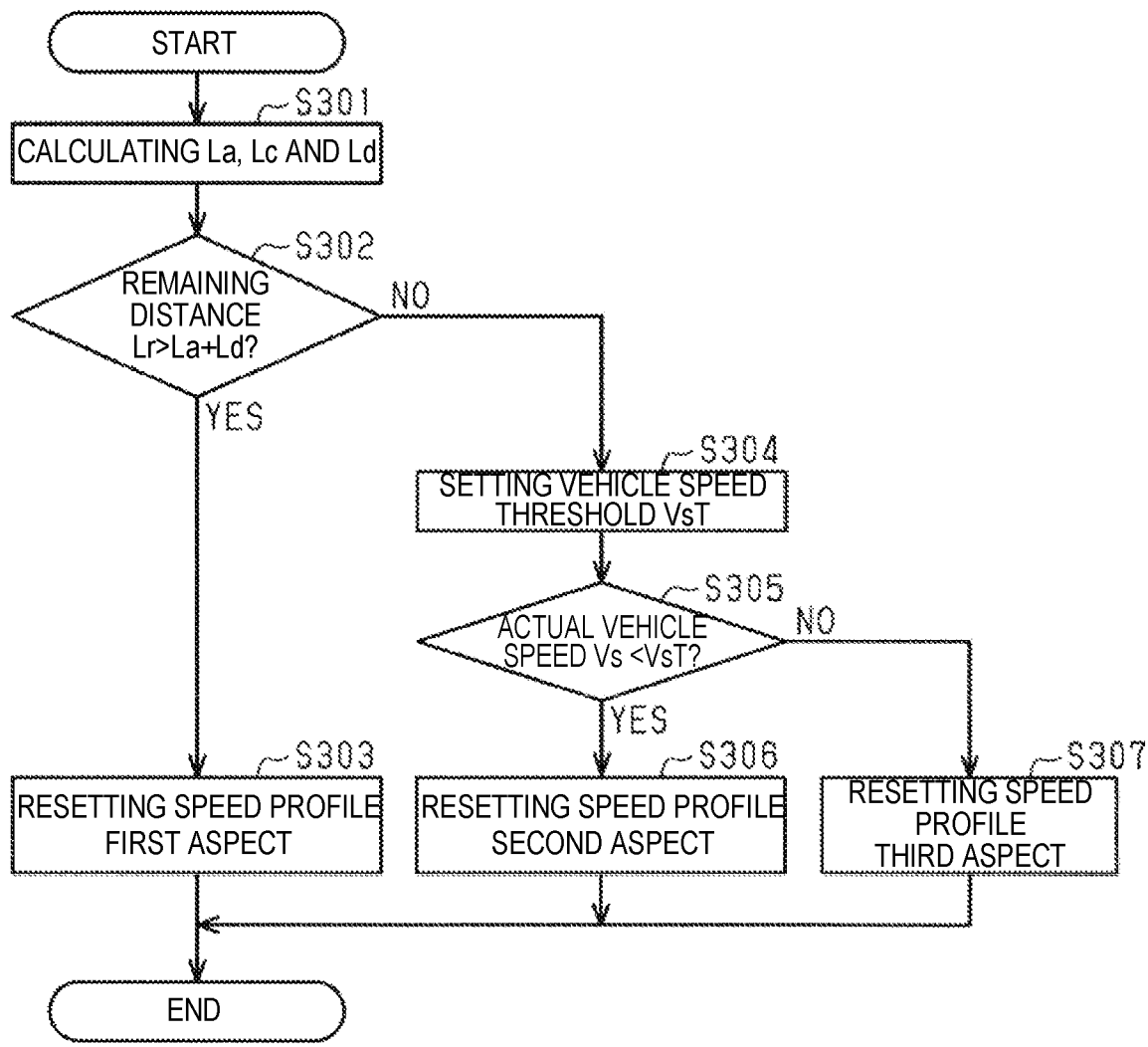
FIG. 4 is a flow chart showing a processing routine of a speed profile resetting process to be executed in the travel control device.

A processing routine of the speed profile resetting process to be executed by the setting section 12 will be described with reference to FIG. 4. The present processing routine is executed following the processing of the step S206 in the interrupt process as shown in FIG. 3.

If the present processing routine is executed, first, in a step S301, the basic acceleration distance La, the basic constant speed distance Lc and the basic deceleration distance Ld are calculated by the setting unit 12. Here, a calculation method similar to the processing in the step S103 is used. If the basic acceleration distance La, the basic constant speed distance Lc and the basic deceleration distance Ld are calculated, the process proceeds to a step S302.

In the step S302, the setting unit 12 determines whether or not the remaining distance Lr is longer than the sum of the basic acceleration distance La and the basic deceleration distance Ld. That is, in the present embodiment, the sum of the basic acceleration distance La and the basic deceleration distance Ld corresponds to an example of a "prescribed distance". If the remaining distance Lr is longer than the sum of the basic acceleration distance La and the basic deceleration distance Ld (S302: YES), the process proceeds to a step S303. In the step S303, resetting of the speed profile is executed in accordance with a first aspect. That is, if the remaining distance Lr is longer than the prescribed distance, the speed profile is reset in accordance with the first aspect. Details of the first aspect with regard to resetting will be described below. If the speed profile is reset, the present processing routine is ended.

Figure 5:
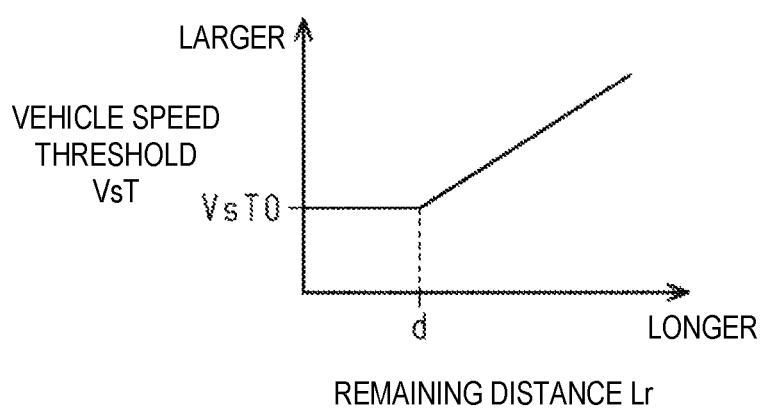
FIG. 5 is a map showing a relationship between the vehicle speed threshold used in the speed profile resetting process and a remaining distance.

On the other hand, if in the step S302 the remaining distance Lr is equal to or smaller than the sum of the basic acceleration distance La and the basic deceleration distance Ld (S302: NO), the process proceeds to a step S304. In the step S304, a vehicle speed threshold VsT is set by the setting unit 12. The vehicle speed threshold VsT is a value used for determining whether or not the actual vehicle speed Vs at a timing when the braking operation is canceled is large. The vehicle speed threshold VsT is calculated using a map, in which a relationship between the remaining distance Lr and the vehicle speed threshold VsT is recorded. An example of the map is shown in FIG. 5. As shown in FIG. 5, in a range in which the remaining distance Lr is shorter than "d", the vehicle speed threshold VsT is set as a prescribed value VsT0. In a range in which the remaining distance Lr is "d" or longer, the longer the remaining distance Lr, the larger the vehicle speed threshold VsT is set. That is, the processing of the step S304 corresponds to an example of a "threshold setting process". If the vehicle speed threshold VsT is set, the process proceeds to a step S305.

In the step S305, it is determined whether or not the actual vehicle speed Vs is smaller than the vehicle speed threshold VsT. If the actual vehicle speed Vs is smaller than the vehicle speed threshold VsT (S305: YES), the process proceeds to a step S306. In the step S306, resetting of the speed profile is executed in accordance with a second aspect. That is, if the remaining distance Lr is equal to or shorter than the prescribed distance and the actual vehicle speed Vs is smaller than the vehicle speed threshold VsT, the speed profile is reset in accordance with the second aspect. Details of the second aspect with regard to resetting will be described below. If the speed profile is reset, the present processing routine is ended.

On the other hand, if in the step S305 the actual vehicle speed Vs is equal to or larger than the vehicle speed threshold VsT (S305: NO), the process proceeds to a step S307. In the step S307, resetting of the speed profile is executed in accordance with a third aspect. That is, if the remaining distance Lr is equal to or shorter than the prescribed distance and the actual vehicle speed Vs is equal to or larger than the vehicle speed threshold VsT, the speed profile is reset in accordance with the third aspect. Details of the third aspect with regard to resetting will be described below. If the speed profile is reset, the present processing routine is ended.

The first aspect in the speed profile resetting process will be described with reference to FIG. 6.

In the resetting process according to the first aspect, a first limited vehicle speed Vt1 is selected as the limited vehicle speed. In the present embodiment, the first limited vehicle speed Vt1 has the same value as the basic limited vehicle speed Vt. Then, the course of the target vehicle speed for each of the travel modes is set based on the actual vehicle speed Vs, the first limited vehicle speed Vt1, the reference acceleration G and the remaining distance Lr.

Specifically, the course of the target vehicle speed is set by the setting unit 12 as follows. The course of the target vehicle speed in the acceleration mode is set by regarding, as a first acceleration distance La1, a distance by which the vehicle will travel while accelerating the vehicle to the first limited vehicle speed Vt1. Also, the course of the target vehicle speed in the constant speed mode is set by regarding, as a first constant speed distance Lc1, a distance by which the vehicle will travel while maintaining the vehicle speed at the first limited vehicle speed Vt1. Further, the course of the target vehicle speed in the deceleration mode is set by regarding, as a first deceleration distance Ld1, a distance by which the vehicle will travel while decelerating the vehicle speed from the first limited vehicle speed Vt1.

The first acceleration distance La1, the first constant speed distance Lc1 and the first deceleration distance Ld1 can be calculated using the following relational expression (Eq. 4, Eq. 5 and Eq. 6).

[Expression 2]

$$La1 = \frac{Vt1^2 - Vs^2}{2G} \quad \text{(Eq. 4)}$$

$$Ld1 = \frac{Vt1^2}{2G} \quad \text{(Eq. 5)}$$

$$Lc1 = Lr - (La1 + Ld1) \quad \text{(Eq. 6)}$$

The first acceleration distance La1, the first constant speed distance Lc1 and the first deceleration distance Ld1 are calculated such that the sum of the first acceleration distance La1, the first constant speed distance Lc1 and the first deceleration distance Ld1 becomes the remaining distance Lr.

Figure 6:
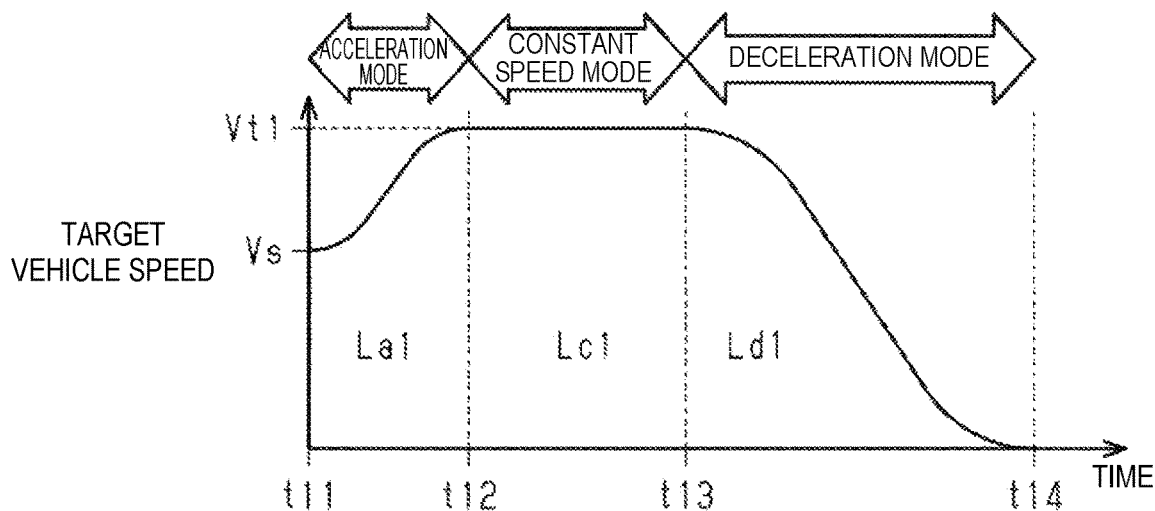
FIG. 6 is a view showing a speed profile reset in accordance with a first aspect.

In FIG. 6, an example of the speed profile reset by the first aspect is shown. In this speed profile, a period of time from a timing t11 when the braking operation is canceled to a timing t12 is a period of time, during which the acceleration mode is executed to increase the target vehicle speed to the first limited vehicle speed Vt1. Then, a period of time from the timing t12 to a timing t13 is a period of time, during which the constant speed mode is executed to maintain the target vehicle speed at the first limited vehicle speed Vt1. Finally, a period of time from the timing t13 to a timing t14 is a period of time, during which the deceleration mode is executed to decrease the target vehicle speed from the first limited vehicle speed Vt1 to "0 km/h".

Meanwhile, in FIG. 6, an integral value of the target vehicle speed in the period of time from the timing t11 to the timing t12, during which the acceleration mode is executed, corresponds to the first acceleration distance La1. An integral value of the target vehicle speed in the period of time from the timing t12 to the timing t13, during which the constant speed mode is executed, corresponds to the first constant speed distance Lc1. An integral value of the target vehicle speed in the period of time from the timing t13 to the timing t14, during which the deceleration mode is executed, corresponds to the first deceleration distance Ld1.

The second aspect in the speed profile resetting process will be described with reference to FIG. 7.

In the resetting process according to the second aspect, a second limit vehicle speed Vt2 having a value smaller than the first limited vehicle speed Vt1 is selected as the limited vehicle speed. The course of the target vehicle speed for each of the travel modes is set based on the actual vehicle speed Vs, the second limited vehicle speed Vt2, the reference acceleration G and the remaining distance Lr.

Specifically, the course of the target vehicle speed is set by the setting unit 12 as follows. The course of the target vehicle speed in the acceleration mode is set by regarding, as a second acceleration distance La2, a distance by which the vehicle will travel while accelerating the vehicle to the second limited vehicle speed Vt2. Also, the course of the target vehicle speed in the constant speed mode is set by regarding, as a second constant speed distance Lc2, a distance by which the vehicle will travel while maintaining the vehicle speed at the second limited vehicle speed Vt2. Further, the course of the target vehicle speed in the deceleration mode is set by regarding, as a second deceleration distance Ld2, a distance by which the vehicle will travel while decelerating the vehicle speed from the second limited vehicle speed Vt2.

The second acceleration distance La2, the second constant speed distance Lc2 and the second deceleration distance Ld2 can be calculated using the following relational expression (Eq. 7, Eq. 8 and Eq. 9).

[Expression 3]

$$La2 = \frac{Vt2^2 - Vs^2}{2G} \quad (Eq.\ 7)$$

$$Ld2 = \frac{Vt2^2}{2G} \quad (Eq.\ 8)$$

$$Lc2 = Lr - (La2 + Ld2) \quad (Eq.\ 9)$$

The second acceleration distance La2, the second constant speed distance Lc2 and the second deceleration distance Ld2 are calculated such that the sum of the second acceleration distance La2, the second constant speed distance Lc2 and the second deceleration distance Ld2 becomes the remaining distance Lr.

Figure 7:
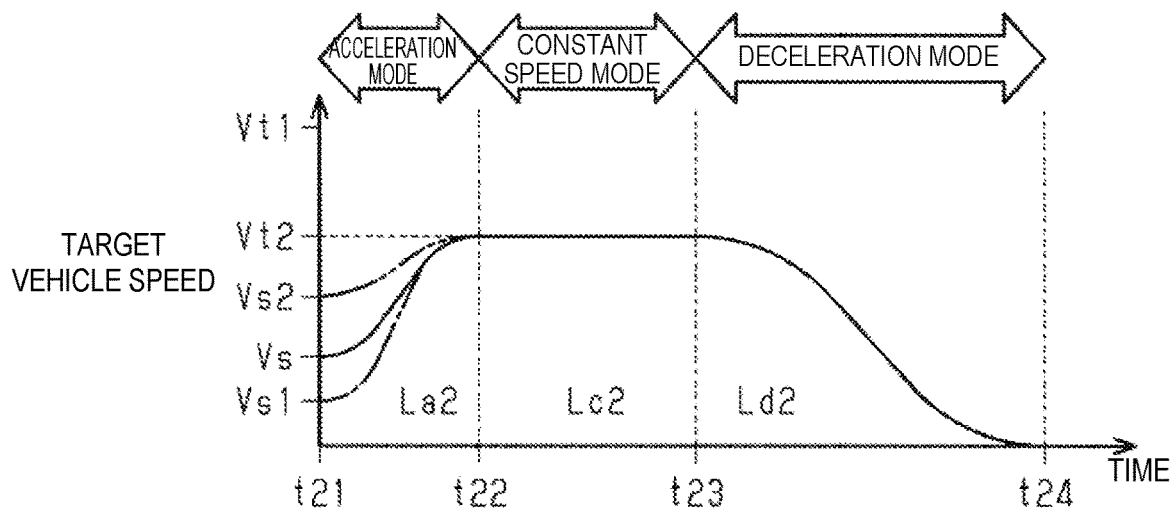
FIG. 7 is a view showing a speed profile reset in accordance with a second aspect.

A solid line shown in FIG. 7 is an example of the speed profile reset by the second aspect. In this speed profile, a period of time from a timing t21 when the braking operation is canceled to a timing t22 is a period of time, during which the acceleration mode is executed to increase the target vehicle speed to the second limited vehicle speed Vt2. Then, a period of time from the timing t22 to a timing t23 is a period of time, during which the constant speed mode is executed to maintain the target vehicle speed at the second limited vehicle speed Vt2. Finally, a period of time from the timing t23 to a timing t24 is a period of time, during which the deceleration mode is executed to decrease the target vehicle speed from the second limited vehicle speed Vt2 to "0 km/h".

Meanwhile, in FIG. 7, an integral value of the target vehicle speed in the period of time from the timing t21 to the timing t22, during which the acceleration mode is executed, corresponds to the second acceleration distance La2. An integral value of the target vehicle speed in the period of time from the timing t22 to the timing t23, during which the constant speed mode is executed, corresponds to the second constant speed distance Lc2. An integral value of the target vehicle speed in the period of time from the timing t23 to the timing t24, during which the deceleration mode is executed, corresponds to the second deceleration distance Ld2.

Figure 8:
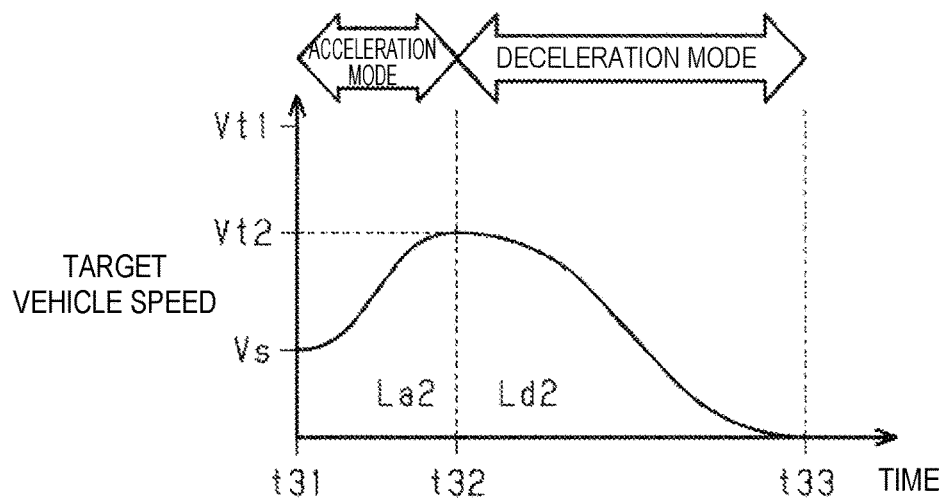
FIG. 8 is a view showing another example of a speed profile reset in accordance with the second aspect.

In addition, in FIG. 8, a speed profile to be set if a calculated value of the second constant speed distance Lc2 in the second aspect is "0" is shown. In this speed profile, as shown in FIG. 8, the constant speed mode is not executed since the second constant speed distance Lc2 is "0". That is, a period of time from a timing t31 to a timing t32 is a period of time, during which the acceleration mode is executed to increase the target vehicle speed to the second limit vehicle speed Vt2. Then, a period of time from the timing t32 to a timing t33 is a period of time, during which the deceleration mode is executed to decrease the target vehicle speed from the second limited vehicle speed Vt2 to "0 km/h".

The third aspect in the speed profile resetting process will be described with reference to FIG. 9.

In the resetting process according to the third aspect, the course of the target vehicle speed is set such that the acceleration mode in the automatic travel control is not executed. That is, in the resetting process according to the third aspect, the course of the target vehicle speed in the constant speed mode and the deceleration mode is set based on the actual vehicle speed Vs, the reference acceleration G and the remaining distance Lr. Meanwhile, in the constant speed mode, a value of the actual vehicle speed Vs at a timing when the request to change the vehicle speed is released is maintained.

Specifically, the course of the target vehicle speed is set by the setting unit 12 as follows. The course of the target vehicle speed in the constant speed mode is set by regarding, as a third constant speed distance Lc3, a distance by which the vehicle will travel while maintaining the vehicle speed. Also, the course of the target vehicle speed in the deceleration mode is set by regarding, as a third deceleration distance Ld3, a distance by which the vehicle will travel while decreasing the vehicle speed.

The third constant speed distance Lc3 and the third deceleration distance Ld3 can be calculated using the following relational expression (Eq. 10 and Eq. 11).

[Expression 4]

$$Ld3 = \frac{Vs^2}{2G} \quad (Eq.\ 10)$$

$$Lc3 = Lr - Ld3 \quad (Eq.\ 11)$$

The third constant speed distance Lc3 and the third deceleration distance Ld3 are calculated such that the sum of the third constant speed distance Lc3 and the third deceleration distance Ld3 becomes the remaining distance Lr.

Figure 9:
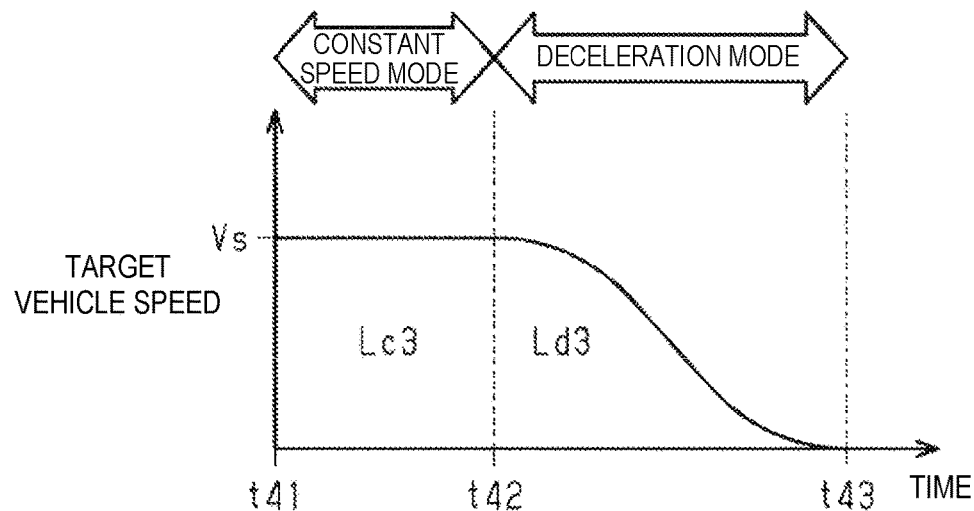
FIG. 9 is a view showing a speed profile reset in accordance with a third aspect.

In FIG. 9, an example of the speed profile reset by the third aspect is shown. In this speed profile, a period of time from a timing t41 when the braking operation is canceled to a timing t42 is a period of time, during which the constant speed mode is executed to maintain the target vehicle speed at an actual vehicle speed Vs detected at the timing t41. Then, a period of time from the timing t42 to a timing t43 is a period of time, during which the deceleration mode is executed to decrease the target vehicle speed from the actual vehicle speed Vs detected at the timing t41 to "0 km/h".

Meanwhile, in FIG. 9, an integral value of the target vehicle speed in the period of time from the timing t41 to the timing t42, during which the constant speed mode is executed, corresponds to the third constant speed distance Lc3. An integral value of the target vehicle speed in the period of time from the timing t42 to the timing t43, during which the deceleration mode is executed, corresponds to the third deceleration distance Ld3.

The operation and effects of the present embodiment will be described.

A case where a request to decelerate a vehicle occurs when the vehicle is automatically traveling toward a target point LE based on a speed profile set by the setting process will be described with reference to FIGS. 3, 4, 6 and 10.

Figure 10A:
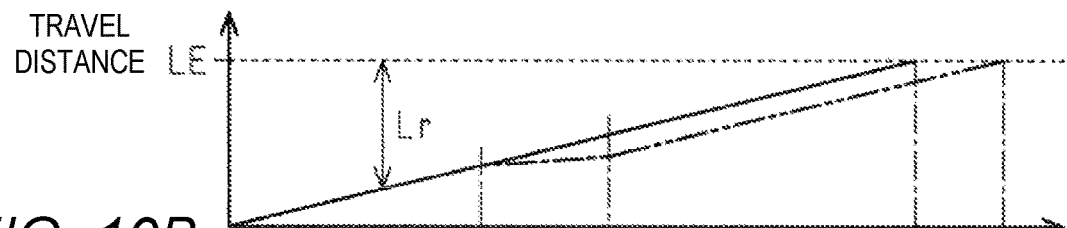
FIGS. 10A to 10C are timing charts in a case where the speed profile is reset by the travel control device.

First, the speed profile set by the setting process before the resetting process is executed will be described with reference to FIG. 10. This speed profile is set based on an actual vehicle speed Vs at a timing t0 and a remaining distance Lr from a position of the vehicle at the timing t0 to the target point LE. If the vehicle travels in accordance with the speed profile set by the setting process, it is expected that the vehicle, which has started traveling from the timing t0, reaches the target point LE at a timing t7 as shown by a solid line in FIG. 10A.

Figure 10B:
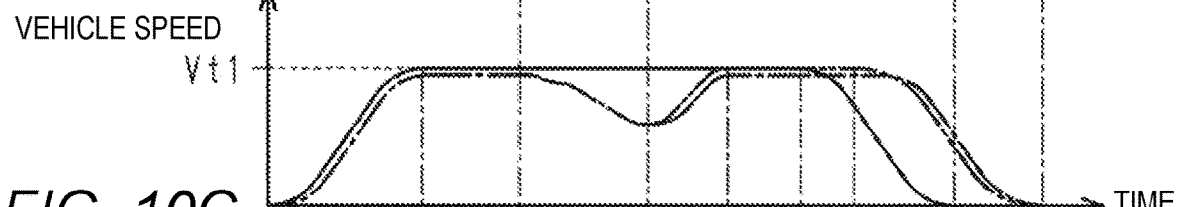

According to the speed profile set by the setting process, a period of time from the timing t0 to a timing t1 is a period of time, during which the acceleration mode is executed to increase a vehicle speed to a basic limited vehicle speed Vt as shown by a solid line in FIG. 10B. At the timing t1, the travel mode is changed from the acceleration mode to the constant speed mode. In the constant speed mode, the vehicle speed is maintained at the basic limited vehicle speed Vt. This constant speed mode is executed from the timing t1 to a timing t5. At the timing t5, the travel mode is changed from the constant speed mode to the deceleration mode. In the deceleration mode, the vehicle speed is decreased from the basic limited vehicle speed Vt to "0 km/h". This deceleration mode is executed until the timing t7. Then, at the timing t7, the vehicle stops at the target point LE.

Next, changes in travel distance and vehicle speed of the vehicle when the speed profile is reset will be described. Herein, an example of a case where a remaining distance Lr at a timing when the braking operation is released is longer than the sum of the basic acceleration distance La and the basic deceleration distance Ld, that is, an example of the first aspect with regard to resetting of the speed profile will be described.

During a period of time from a timing t0 to a timing t1, the acceleration mode is executed in accordance with the speed profile described above. Therefore, the target vehicle speed is increased to the basic limited vehicle speed Vt by the acceleration mode. The actual vehicle speed Vs is increased to follow the increase in the target vehicle speed. Then, at the timing t1, the travel mode is changed from the acceleration mode to the constant speed mode. Thus, the target vehicle speed is maintained at the basic limited vehicle speed Vt.

On the other hand, at the timing t1, the target vehicle speed is the same as the basic limited vehicle speed Vt, but the actual vehicle speed Vs may not yet reach the target vehicle speed (=basic limited vehicle speed Vt). In this case, even after the timing t1, the actual vehicle speed Vs continues to be increased until the actual vehicle speed Vs reaches the target vehicle speed.

Figure 10C:
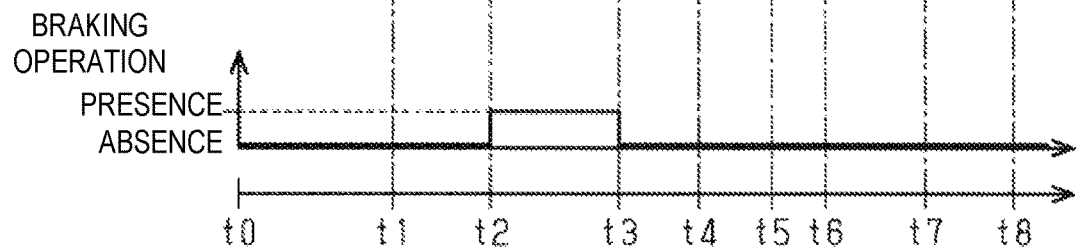

At a timing t2, operation of a brake pedal by a driver of the vehicle is started. Then, since a signal to be inputted from the braking operation amount sensor 43 to the travel control device 10 is changed, the braking operation is detected by the detection unit 11 as shown in FIG. 10C. That is, it can be determined that a request to decelerate the vehicle has been occurred. As described with reference to FIG. 3, if the braking operation is detected in this way (S201: YES), executing of the F/B control in the operation amount calculation unit 13 is stopped (S202). Therefore, an operation amount X calculated by the operation amount calculation unit 13 becomes the same as the control amount calculated by the F/F control. Therefore, as shown in FIG. 10B, the target vehicle speed shown by a solid line is maintained after the timing t2, but the actual vehicle speed Vs shown by a one-dotted chain line is decreased as much as increase in braking force to the vehicle due to braking operation by the driver. As a result, as shown in FIG. 10A, an actual travel distance shown by a one-dotted chain line deviates from a target value of the travel distance based on the speed profile indicated by the solid line. That is, the actual travel distance does not follow the target value of the travel distance, which changes over time, and a rate of shortening the remaining distance Lr is short, as compared with a case where the braking operation is not performed during the automatic travel control.

Then, in the example shown in FIG. 10, the braking operation is released at a timing t3. Thus, since the signal to be inputted from the braking operation amount sensor 43 to the travel control device 10 is changed, the braking operation is not detected by the detection unit 11 as shown in FIG. 10C. That is, it can be determined that a request to decelerate the vehicle has been canceled. As described with reference to FIG. 3, if the braking operation is released in this way (S203: YES), the travel control device 10 executes the speed profile resetting process (S206). According to the resetting process, as described with reference to FIG. 4, since the remaining distance Lr at the timing t3 when the braking operation is canceled is longer than the sum of the basic acceleration distance La and the basic deceleration distance Ld (S302: YES), the speed profile is reset by the aspect (S303). Then, after the timing t3, executing of the F/B control in the operation amount calculation unit 13 is resumed (S207). Thus, an operation amount X calculated by the operation amount calculation unit 13 becomes the same as the sum of a control amount calculated by the F/F control and a control amount calculated by the F/B control.

In FIG. 10B, the speed profile reset by the first aspect is shown by a two-dotted chain line. According to the reset speed profile, during a period of time from the timing t3 to a timing t4, the acceleration mode is executed as the travel mode. At the timing t4, the travel mode is changed from the acceleration mode to the constant speed mode, and then during a period of time from the timing t4 to a timing t6, the constant speed mode is executed as the travel mode. At the timing t6, the travel mode is changed from the constant speed mode to the deceleration mode, and then during a period of time from the timing t6 to a timing t8, the deceleration mode is executed as the travel mode. If the vehicle travels in accordance with the speed profile reset in this way, it is expected that the vehicle reaches the target point LE at the timing t8 which is later than the timing t7.

According to the travel control device 10, the speed profile is reset based on the actual vehicle speed Vs when the braking operation is canceled and the remaining distance Lr when the braking operation is canceled. Then, an operation amount X is calculated using a target vehicle speed based on the reset speed profile, and driving of the driving device 32 or the braking device 31 is controlled based on the operation amount X. Therefore, even when the vehicle is decelerated due to the braking operation performed during automatic traveling, the vehicle can be moved to the target point LE.

Also, according to the travel control device 10, the remaining distance Lr is calculated before the speed profile is reset. Therefore, it is possible to reset the speed profile using the remaining distance Lr, in which a travel distance of the vehicle during the braking operation is reflected. Accordingly, an offset between the target point LE and a position where the vehicle will actually stop can be reduced.

Further, when the braking operation is released, the speed profile is reset and the F/B control is executed based on a deviation between the target vehicle speed, which is based on the reset speed profile, and the actual vehicle speed Vs. Therefore, it is possible to suppress the operation amount X calculated by the operation amount calculation unit 13 from being excessively calculated, as compared with a case where the F/B control is executed based on a deviation between the actual vehicle speed Vs and the target vehicle speed, which is based on the initial speed profile set before starting of the braking operation. Accordingly, it is possible to suppress a sudden acceleration of the vehicle after the braking operation is released.

According to the travel control device 10, if the remaining distance Lr at a timing when a request to change the vehicle speed, such as the braking operation, is released is longer than the sum of the basic acceleration distance La and the basic deceleration distance Ld (S302: YES), the speed profile is reset by the first aspect, in which the upper limit of the vehicle speed is set to the first limited vehicle speed Vt1 (S303). On the other hand, if the remaining distance Lr is shorter than the sum of the basic acceleration distance La and the basic deceleration distance Ld (S302: NO) and also the actual vehicle speed Vs is smaller than the vehicle speed threshold VsT (S305: YES), the speed profile is reset by the second aspect, in which the upper limit of the vehicle speed is set to the second limited vehicle speed Vt2 (S306). That is, if the remaining distance Lr is long, the acceleration mode is executed with the upper limit of the vehicle speed set to the first limit vehicle speed Vt1. In this way, when the remaining distance Lr is long, the maximum vehicle speed of the vehicle heading toward the target point LE can become larger than that when the remaining distance Lr is not long. As a result, it is possible to suppress a time until the vehicle reaches the target point LE from being excessively prolonged when a distance to the target point LE is long. On the other hand, when a distance to the target point LE is short, the maximum vehicle speed of the vehicle heading toward the target point LE is not so large. That is, it is possible to avoid excessive increase in the vehicle speed when the remaining distance Lr is short and a distance to the target point (LE) is short.

Further, according to the travel control device 10, if the remaining distance Lr is equal to or shorter than the sum of the basic acceleration distance La and the basic deceleration distance Ld (S302: NO) and also the actual vehicle speed Vs is equal to or larger than the vehicle speed threshold VsT (S305: NO), the speed profile is reset by the third aspect, in which the acceleration mode is not executed (S307). Accordingly, it is possible to suppress the vehicle speed from being further increased until the vehicle reaches the target point LE, if the remaining distance Lr is short and also the actual vehicle speed Vs is large enough to travel the remaining distance Lr.

In addition, in the travel control device 10, as shown in FIG. 5, the vehicle speed threshold VsT is set to a larger value as the remaining distance Lr is longer than "d". Accordingly, when resetting the speed profile, it is possible to use the second aspect and the third aspect separately based on the extent of the remaining distance Lr. That is, the longer the remaining distance Lr, the larger the vehicle speed threshold VsT is, and thus the speed profile is likely to be reset by the second aspect, in which the acceleration mode is executed. Therefore, it is possible to suppress the third mode from being selected when the remaining distance Lr is long. As a result, since the acceleration mode is not executed, it is possible to suppress a time until the vehicle reaches the target point LE from being excessively prolonged.

Here, it is also conceivable to reset the speed profile by the first aspect irrespective of the remaining distance Lr at a timing when a request to change the vehicle speed, such as the braking operation, is released. In this case, if the remaining distance Lr is short, there is a risk that in the acceleration mode or the deceleration mode, the target vehicle speed is changed such that it is difficult for the actual vehicle speed Vs to follow the target vehicle speed. In this regard, in the travel control device 10, the aspect of resetting the speed profile is changed in accordance with a state of the vehicle when the braking operation is released. Accordingly, it is possible to suppress a rapid change in the target vehicle speed after the braking operation is released, and correspondingly to improve followability of the vehicle speed with respect to the target vehicle speed. Therefore, it is possible to suppress a deviation between a position where the vehicle will actually stop and the target point LE.

This embodiment can be implemented by modifying as follows. The present embodiment and the following modifications thereof can be implemented in combination with each other within a range which is not technically contradictory.

Although an example of setting the speed profile shown in FIGS. 6 to 9 has been described in the foregoing embodiment, but the speed profile is not limited thereto. If a request to change the vehicle speed has occurred, the profile may be reset at a timing when the request is canceled, based on an actual vehicle speed and a position of the vehicle at the timing, thereby achieving effects similar to the foregoing embodiment.

In the foregoing embodiment, the braking operation is illustrated as a request to change the vehicle speed. However, the request to change the vehicle speed is not limited to the braking operation. For example, an acceleration operation, such as operation on an accelerator pedal, may be applied. In this case, in the step S201 in FIG. 3, it is determined whether or not an acceleration operation is being performed, and in the step S203, it is determined whether or not the acceleration operation is released. Then, if the speed profile is reset at a timing when the acceleration operation is released, it is possible to make the vehicle travel to the target point LE while reflecting the change in the vehicle speed and the travel distance while the acceleration operation is being performed, like the foregoing embodiment.

In addition, operation on the vehicle, which is likely to change the vehicle speed, is not limited to operation on an on-vehicle device, such as the brake pedal or the accelerator pedal. For example, a travel control device capable of communicating with a communication terminal, such as a smart phone or a tablet terminal, can be considered. According to such a travel control device, a parking position can be set as the target point LE and automatic traveling of the vehicle to the target point LE can be assisted. Also in this case, a speed profile can be set by the setting process, and automatic traveling of the vehicle in accordance with the speed profile can be assisted. While the travel control device assists automatic traveling in this way, if a request to change the vehicle speed is inputted from the communication terminal to the travel control device by operation of the communication terminal by a user, the vehicle speed is changed based on the request. Then, when the request is released, the speed profile may be reset based on an actual vehicle speed Vs and a remaining distance Lr at the timing, like the foregoing embodiment. Also in this case, by assisting automatic traveling of the vehicle in accordance with the reset speed profile, effects similar to the foregoing embodiment can be achieved.

In addition, the request to change the vehicle speed irrespective of acceleration/deceleration is not limited to operation by a driver. For example, if a request to change the vehicle speed commanded by a control device of the vehicle intervenes during execution of the automatic travel control, the travel control device may be configured to reset the speed profile based on occurrence and cancel of the request. If a request is one to change the vehicle speed, irrespective of types thereof, the speed profile can be reset at a timing when the request is canceled, like the foregoing embodiment. Accordingly, effects similar to the foregoing embodiment can be achieved.

In the foregoing embodiment, the prescribed reference acceleration G is used for setting the speed profile. However, an alternative acceleration G* set based on a difference between the limited vehicle speed and the actual vehicle speed Vs may be used as acceleration for the vehicle in the acceleration mode.

For example, referring to FIG. 7, based on a difference between the second limited vehicle speed Vt2 and the actual vehicle speed Vs, the larger the difference, the larger the alternative acceleration G* is set. If the difference is large, i.e., when the vehicle speed at the timing t21 has a value "Vs1" smaller than the actual vehicle speed Vs, an amount of increase in the vehicle speed per unit time becomes large as shown by a one-dotted chain line. On the other hand, if the difference is small, i.e., when the vehicle speed at the timing t21 has a value "Vs2" larger than the actual vehicle speed Vs, an amount of increase in the vehicle speed per unit time becomes small as shown by a two-dotted chain line.

By employing the alternative acceleration G* which has a variable value in this way, it is possible to allow the vehicle speed to quickly reach the limited vehicle speed, even if the actual vehicle speed Vs when the braking operation is released is small. Accordingly, a time until the vehicle reaches the target point LE can be shortened.

In the foregoing embodiment, a map in which the relationship shown in FIG. 5 is recorded is used for setting the vehicle speed threshold VsT. The vehicle speed threshold VsT is not limited to setting as a constant value in a range of the remaining distance Lr in which the remaining distance Lr is shorter than "d" as shown in FIG. 5. In all ranges of the remaining distance Lr, a map in which a relationship, in which the longer the remaining distance Lr, the larger the vehicle speed threshold VsT is set, is recorded may be employed. In addition, the vehicle speed threshold VsT may be set to be gradually increased as the remaining distance Lr becomes longer.

In the foregoing embodiment, the vehicle speed threshold VsT is set based on the relationship between the remaining distance Lr and the vehicle speed threshold VsT. However, a predetermined prescribed threshold may be employed as the vehicle speed threshold VsT.

In the foregoing embodiment, executing of the F/B control by the operation amount calculation unit 13 is stopped if a request to change the vehicle speed occurs. However, as long as the vehicle speed can be changed in response to the request, it is not necessary to stop the F/B control by the operation amount calculation unit 13 when the request is occurring. For example, the sum of a control amount calculated by the F/F control and the smaller one of a control amount calculated by the F/B control and an upper limit value may be calculated as an operation amount X.

In the foregoing embodiment, the sum of the basic acceleration distance La and the basic deceleration distance Ld is set as the prescribed distance. However, the prescribed distance is sufficient if a value thereof corresponds to the sum of the basic acceleration distance La and the basic deceleration distance Ld, and accordingly is not limited to the same value as the sum. For example, the sum of the basic acceleration distance La, the basic deceleration distance Ld and a predetermined offset value may be set as the prescribed distance. In this case, the offset value is set to have a value shorter than the basic acceleration distance La and the basic deceleration distance Ld. For example, it is preferable that the offset value is shorter than half of the smaller one of the basic acceleration distance La and the basic deceleration distance Ld.

In the foregoing embodiment, the reference acceleration G used for calculating the basic acceleration distance La is set to have the same value as that of the reference acceleration G used for calculating the basic deceleration distance Ld. However, the reference acceleration G used for calculating the basic acceleration distance La may be set to be different from the reference acceleration G used for calculating the basic deceleration distance Ld.

In the foregoing embodiment, an input signal from the monitoring device 41 is used to detect a position of the vehicle. Alternatively, an actual position of the vehicle may be acquired based on positional information obtained from the GPS.

In the foregoing embodiment, an actual position of the vehicle is acquired based on an input signal from the monitoring device 41. Alternatively, the actual position of the vehicle may be estimated based on a distance to the target point LE and a travel distance.

The invention claimed is:

1. A travel control device for assisting automatic traveling of a vehicle, in which the vehicle is made to travel to and stop at a target point, by controlling a target vehicle speed, wherein the target vehicle speed is a target value of an actual vehicle speed, and the actual vehicle speed is a speed of the vehicle, the travel control device comprising:
    a setting unit for executing a setting process for setting a course of the target vehicle speed until the vehicle reaches the target point, based on 1), the current actual vehicle speed and 2) a distance from a current position of the vehicle to the target point; and
    an operation amount calculation unit for calculating an operation amount used to control at least one of a driving device and a braking device of the vehicle so that the actual vehicle speed follows the course of the target vehicle speed,
    wherein the setting unit is configured:
    if 1) a request to change the actual vehicle speed occurs during execution of the automatic traveling and 2) the actual vehicle speed does not follow the course of the target vehicle speed based on the request, to execute a resetting process for resetting the course of the target vehicle speed, based on 1) the actual vehicle speed when the request is canceled and 2) a remaining distance from a position of the vehicle when the request is canceled to the target point;
    when the request is canceled, if the remaining distance is longer than a prescribed distance, to reset the course of the target vehicle speed in the resetting process in such a manner that the target speed does not exceed a prescribed first limited vehicle speed, and then the vehicle is decelerated; and
    when the request is canceled, if the remaining distance is equal to or shorter than the prescribed distance and the actual vehicle speed is smaller than a prescribed vehicle speed threshold, to reset the course of the target vehicle speed in the resetting process in such a manner that the target speed does not exceed a prescribed second limited vehicle speed, and then the vehicle is decelerated, wherein the second limited vehicle speed is smaller than the first limited vehicle speed.

2. The travel control device according to claim 1, wherein the setting unit is configured:
    when the request is canceled, if the remaining distance is equal to or shorter than the prescribed distance and the actual vehicle speed is smaller than the vehicle speed threshold,
    to reset the course of the target vehicle speed in the resetting process in such a manner that the vehicle speed of the vehicle is maintained at the second limited vehicle speed and then the vehicle is decelerated.

3. The travel control device according to claim 1, wherein the operation amount calculation unit is configured:

when the request is canceled, if the remaining distance is equal to or shorter than the prescribed distance and the actual vehicle speed is smaller than the vehicle speed threshold, to calculate the operation amount in such a manner that during a period of time until the actual vehicle speed reaches the second limited vehicle speed, the target vehicle speed is set to the second limited vehicle speed and also the larger a difference between the target vehicle speed and the actual vehicle speed, the larger the acceleration/deceleration of the vehicle becomes.

4. The travel control device according to claim 2, wherein the operation amount calculation unit is configured:

when the request is canceled, if the remaining distance is equal to or shorter than the prescribed distance and the actual vehicle speed is smaller than the vehicle speed threshold, to calculate the operation amount in such a manner that during a period of time until the actual vehicle speed reaches the second limited vehicle speed, the target vehicle speed is set to the second limited vehicle speed and also the larger a difference between the target vehicle speed and the actual vehicle speed, the larger the acceleration/deceleration of the vehicle becomes.

5. The travel control device according to claim 1, wherein the setting unit is configured:

when the request is canceled, if the remaining distance is equal to or shorter than the prescribed distance and the actual vehicle speed is equal to or larger than the vehicle speed threshold, to reset the course of the target vehicle speed in the resetting process in such a manner that the vehicle is not accelerated.

6. The travel control device according to claim 2, wherein the setting unit is configured:

when the request is canceled, if the remaining distance is equal to or shorter than the prescribed distance and the actual vehicle speed is equal to or larger than the vehicle speed threshold, to reset the course of the target vehicle speed in the resetting process in such a manner that the vehicle is not accelerated.

7. The travel control device according to claim 3, wherein the setting unit is configured:

when the request is canceled, if the remaining distance is equal to or shorter than the prescribed distance and the actual vehicle speed is equal to or larger than the vehicle speed threshold, to reset the course of the target vehicle speed in the resetting process in such a manner that the vehicle is not accelerated.

8. The travel control device according to claim 4, wherein the setting unit is configured:

when the request is canceled, if the remaining distance is equal to or shorter than the prescribed distance and the actual vehicle speed is equal to or larger than the vehicle speed threshold, to reset the course of the target vehicle speed in the resetting process in such a manner that the vehicle is not accelerated.

9. The travel control device according to claim 1, wherein the setting unit is configured to execute a threshold setting process in such a manner that the longer the remaining distance, the larger the vehicle speed threshold becomes.

10. The travel control device according to claim 2, wherein the setting unit is configured to execute a threshold setting process in such a manner that the longer the remaining distance, the larger the vehicle speed threshold becomes.

11. The travel control device according to claim 3, wherein the setting unit is configured to execute a threshold setting process in such a manner that the longer the remaining distance, the larger the vehicle speed threshold becomes.

12. The travel control device according to claim 4, wherein the setting unit is configured to execute a threshold setting process in such a manner that the longer the remaining distance, the larger the vehicle speed threshold becomes.

13. The travel control device according to claim 5, wherein the setting unit is configured to execute a threshold setting process in such a manner that the longer the remaining distance, the larger the vehicle speed threshold becomes.

14. The travel control device according to claim 1, wherein the request occurs by operation by a driver of the vehicle.

15. The travel control device according to claim 2, wherein the request occurs by operation by a driver of the vehicle.

16. The travel control device according to claim 3, wherein the request occurs by operation by a driver of the vehicle.

17. The travel control device according to claim 5, wherein the request occurs by operation by a driver of the vehicle.

18. The travel control device according to claim 9, wherein the request occurs by operation by a driver of the vehicle.

* * * * *